US008244706B2

(12) United States Patent
Christensen et al.

(10) Patent No.: US 8,244,706 B2
(45) Date of Patent: Aug. 14, 2012

(54) METHOD AND APPARATUS FOR SEMANTIC JUST-IN-TIME-INFORMATION-RETRIEVAL

(75) Inventors: James E. Christensen, Cortlandt Manor, NY (US); Daniel M. Gruen, Newton, MA (US); Susanne Hupfer, Lexington, MA (US); Stephen E. Levy, Honolulu, HI (US); John F. Patterson, Carlisle, MA (US); Jamie C. Rasmussen, Somerville, MA (US); Steven I. Ross, South Hamilton, MA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 12/642,372

(22) Filed: Dec. 18, 2009

(65) Prior Publication Data

US 2011/0153639 A1 Jun. 23, 2011

(51) Int. Cl.
*G06F 17/30* (2006.01)
(52) U.S. Cl. ........................................ 707/706; 707/769
(58) Field of Classification Search .................. 707/706, 707/769
See application file for complete search history.

(56) References Cited

U.S. PATENT DOCUMENTS

| | | | | |
|---|---|---|---|---|
| 5,873,107 A | * | 2/1999 | Borovoy et al. | 715/234 |
| 5,983,218 A | * | 11/1999 | Syeda-Mahmood | 707/769 |
| 6,101,491 A | * | 8/2000 | Woods | 707/696 |
| 6,212,524 B1 | * | 4/2001 | Weissman et al. | 707/600 |
| 6,434,549 B1 | * | 8/2002 | Linetsky et al. | 707/719 |
| 6,941,297 B2 | * | 9/2005 | Carmel et al. | 707/765 |
| 7,028,253 B1 | * | 4/2006 | Lieberman et al. | 715/232 |
| 7,146,361 B2 | * | 12/2006 | Broder et al. | 707/769 |
| 7,299,238 B2 | * | 11/2007 | Corston-Oliver et al. | 707/749 |
| 2006/0271520 A1 | * | 11/2006 | Ragan | 707/3 |

OTHER PUBLICATIONS

D. Gruen, J. Rasmussen, J. Liu, S. Hupfer, and S. Ross. "Collaborative Reasoning and Collaborative Ontology Development in CRAFT". *AAAI Spring Symposium on Semantic Web and Knowledge Engineering (SWKE)*, Stanford, CA, Mar. 2008.

Rhodes, B.J., and Maes, P., "Just-In-Time Information Retrieval Agents", *IBM Systems Journal*, vol. 39, Nos. 3 & 4, 2000.

\* cited by examiner

*Primary Examiner* — Kim Nguyen
(74) *Attorney, Agent, or Firm* — Hamilton, Brook, Smith & Reynolds, P.C.

(57) ABSTRACT

A computer-based method and system for just-in-time semantic information retrieval is disclosed. A user interface detects user interaction with a displayed semantic entity. In response, a search member uses semantic information about the displayed entity and automatically searches for information about the subject entity. The search employs system and/or external knowledge bases and returns highly relevant results and information with increased specificity due to the semantic basis. A sidebar unobtrusively displays to the user the search results initially obtained without user request or demand, i.e., on the user's behalf. The sidebar enables the user to dismiss the search results and to effectively copy or export the search results as desired.

23 Claims, 6 Drawing Sheets

METHOD AND APPARATUS FOR SEMANTIC JUST-IN-TIME-INFORMATION-RETRIEVAL

GOVERNMENT SUPPORT

This invention was made with Government support under Distillery Phase IV-H98230-07-C-0383 awarded by a United States of America Intelligence Agency. The Government has certain rights to this invention.

BACKGROUND

The present invention relates to automatic searches of knowledge bases on a user's behalf using semantic information.

The accumulation of relevant knowledge in corporate databases and online repositories has advanced to the state where vast amounts of information are available and readily accessible. A simple search performed on a search engine such as Google can quickly locate information on virtually any subject imaginable. In conducting any knowledge-based activity, e.g. researching a topic or making a decision, a user must gather information, typically by executing many searches. Since people are frequently busy and strapped for time, and because a user may be unaware of the full range of information that may be available on a particular topic, some searches that might well have been worthwhile may be omitted, and opportunities that would have been available had the associated information been found might be missed.

BRIEF SUMMARY

The present invention assists users by performing automatic searches of knowledge bases on the user's behalf, and unobtrusively displaying the results as the user proceeds with his/her knowledge-based task. The searches are guided by semantic information drawn from the user's task, and thus can produce more relevant results than text-based, non-semantic searches. The user is free to use or ignore the results returned by these automatic searches.

Embodiments of the present invention system support collaborative reasoning. One aspect of the invention system is that it supports the collection and organization of information. In one embodiment, the invention system provides an investigation tableau, a 2D (two dimensional) display on which relevant semantic entities (e.g., people, places, events) and claims about the entities can be represented and arranged. Free-form text notes can also be created or placed on the tableau, upon which entity extraction is performed to identify semantic entities mentioned in the note. Entities and claims are stored in a semantic knowledge base. External knowledge bases with information on a variety of entities such as DBPedia or other internet-mediated data stores can also be integrated with the invention system.

When a user selects or creates an entity, or selects an identified entity in a textual note, the invention system automatically searches its internal and external knowledge bases for information about this entity, and presents the information it finds in a sidebar. The user does not have to explicitly request a search to take place, and does not have to pay any attention to the search results. The results are simply displayed, and the user is free to drag desired information from the sidebar into the investigation tableau, or to ignore that information if it is not relevant or desired.

Besides being triggered by a user's selection of an entity, these automatic searches could be triggered in other manners as well. For instance, a user could visually select (e.g. by dragging an outline or by other graphical indications or using keystrokes) a portion of the 2D tableau, and an automatic search could be triggered on all semantic entities in that area and/or in text notes appearing in that area. Selection of a text note containing multiple identified entities could result in a search for information on all the entities.

According to one embodiment of the present invention, a computer implemented method, apparatus and system detect user interaction (via a user-interface) with a displayed entity representing a real world item. The displayed entity is a semantic entity representing a person, place or event, and has semantic data. Using the semantic data, a search member of the invention system/method/apparatus searches one or more knowledge bases for information about the displayed entity based on semantic data (as opposed to a text-based, non-semantic search). The user interface automatically displays to the user the information about the displayed entity from the search results. The searching for and displaying of information about the displayed entity is performed free of user request or demand and hence provide automatic information retrieval on a user's behalf.

Although one embodiment displays the search results through a sidebar, various formats and techniques for displaying the search results are suitable. In one embodiment, the sidebar is configured to enable any one or combination of: user copying/exporting of the search results, user dismissal of the search results and user disambiguation of the displayed entity to begin a search/retrieval of information.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

The notion of Just-In-Time-Information-Retrieval (JITIR) is not new. A JITIR system must satisfy three criteria:
1. Proactivity—the system retrieves information without being asked to
2. Presentation of information in an accessible yet unintrusive manner
3. Awareness of the user's local context.

The present invention satisfies these criteria. Existing JITIR systems, like the Remembrance Agent (see Rhodes, B. J., and Maes, P., "Just-In Time Information Retrieval Agents", IBM Systems Journal, Volume 39, Numbers 3 and 4, 2000)

present relevant documents, emails, or web pages based on text-based search and indexing. By contrast, Applicant's approach is able to provide more directly relevant information specifically about the entity in question by leveraging a semantic representation of information and a structured knowledge repository.

In one embodiment of the present invention, an investigation tableau provides the context required for the JITIR system. The entities represented in the tableau, either in isolation or embedded within text notes are intended to refer to particular people, organizations, locations, events, etc. Initially, however, the entity specification will often be ambiguous. When an ambiguous entity specification is selected, the invention system consults its knowledge base to find possible referents, and then displays the list of possible referents in the sidebar, giving the user the opportunity to disambiguate it. Once this has been done, the system knows what entity is being referred to, and can look up information concerning that entity in its knowledge base, and display that information in the sidebar.

Figure 1:
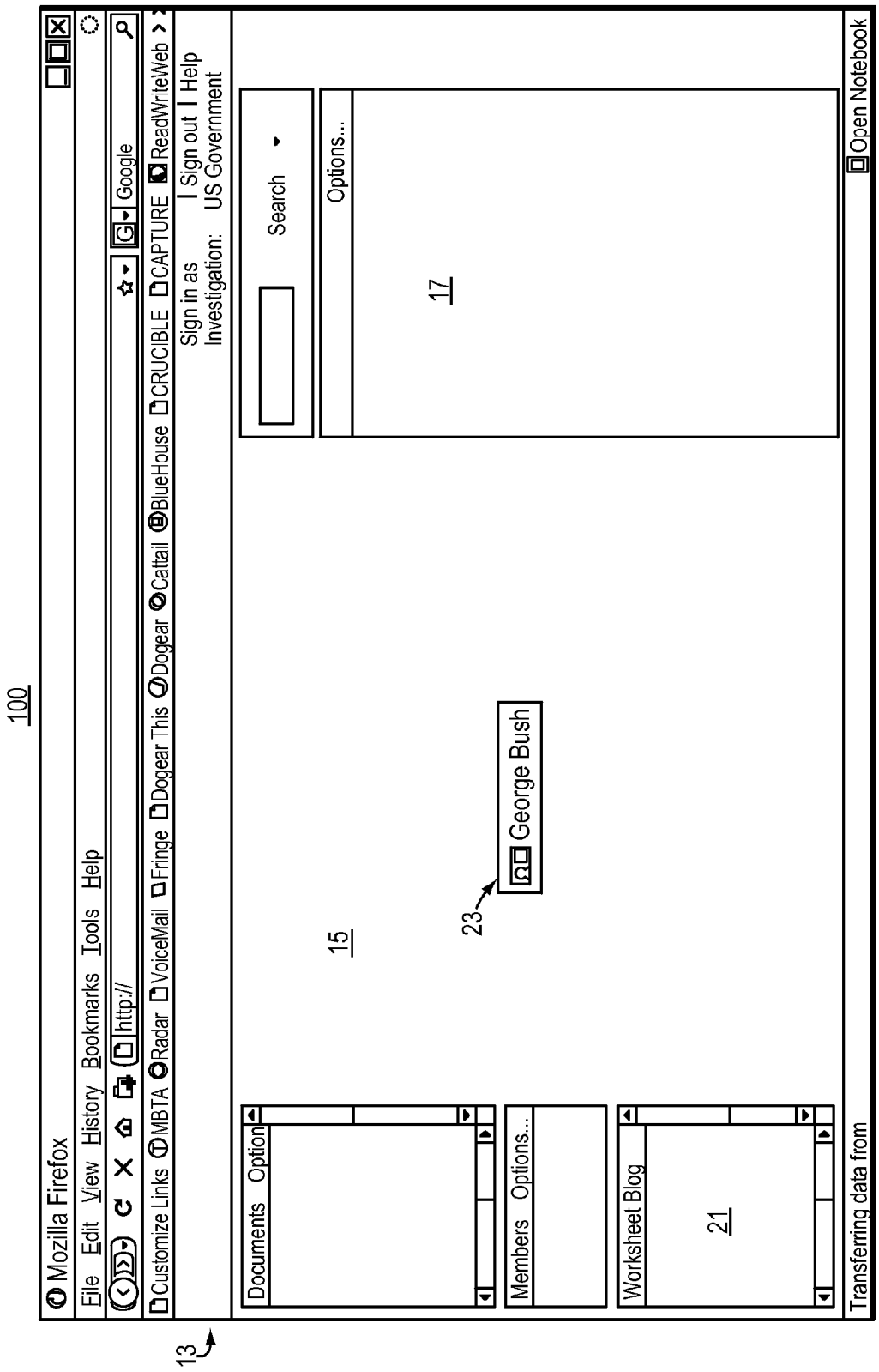
FIG. 1 is a schematic view of a user interface in one embodiment of the present invention.
Figure 2:
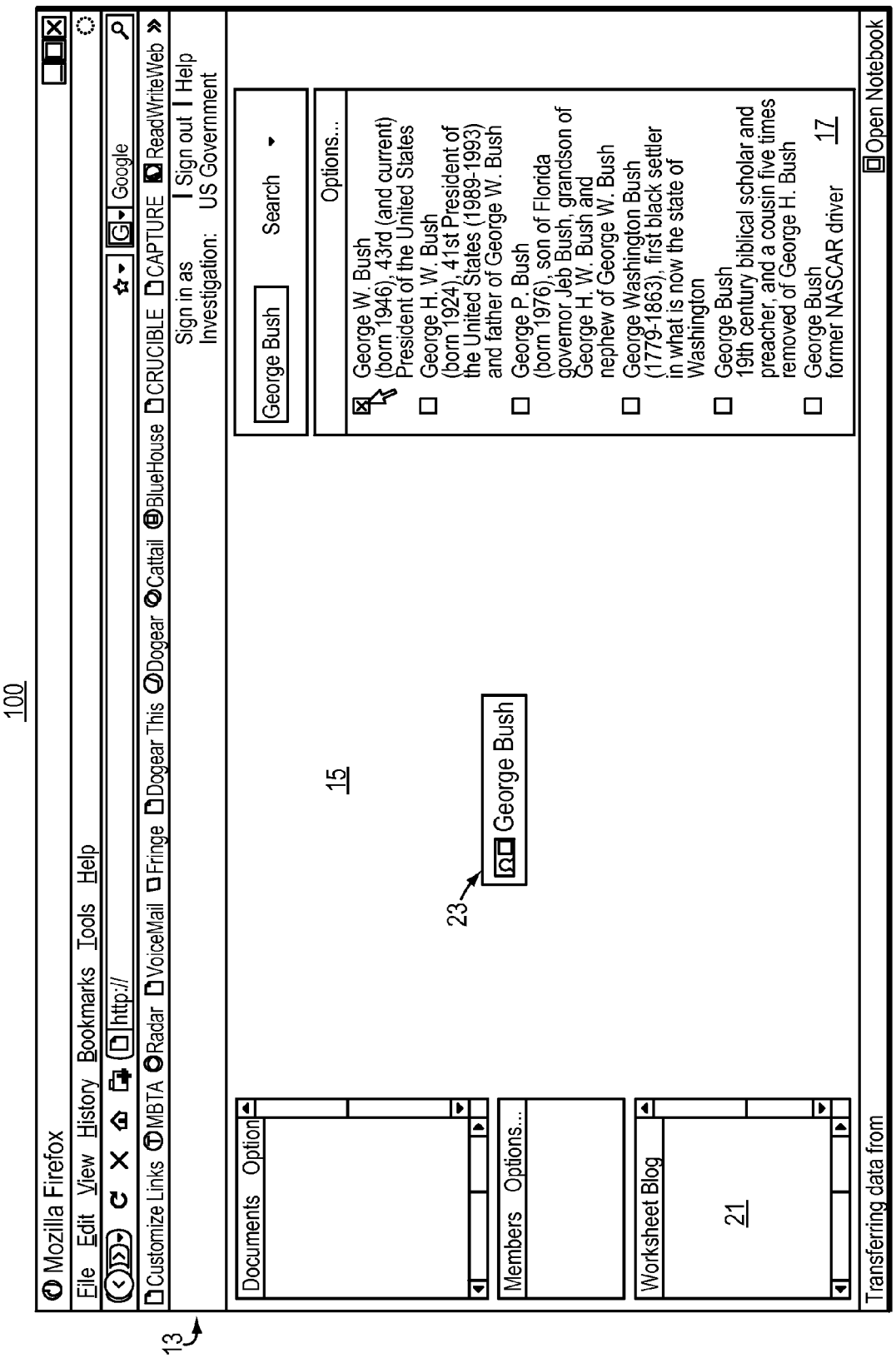
FIG. 2 is a schematic view of the user interface of the FIG. 1 embodiment disambiguating terms (the subject entity).
Figure 3:
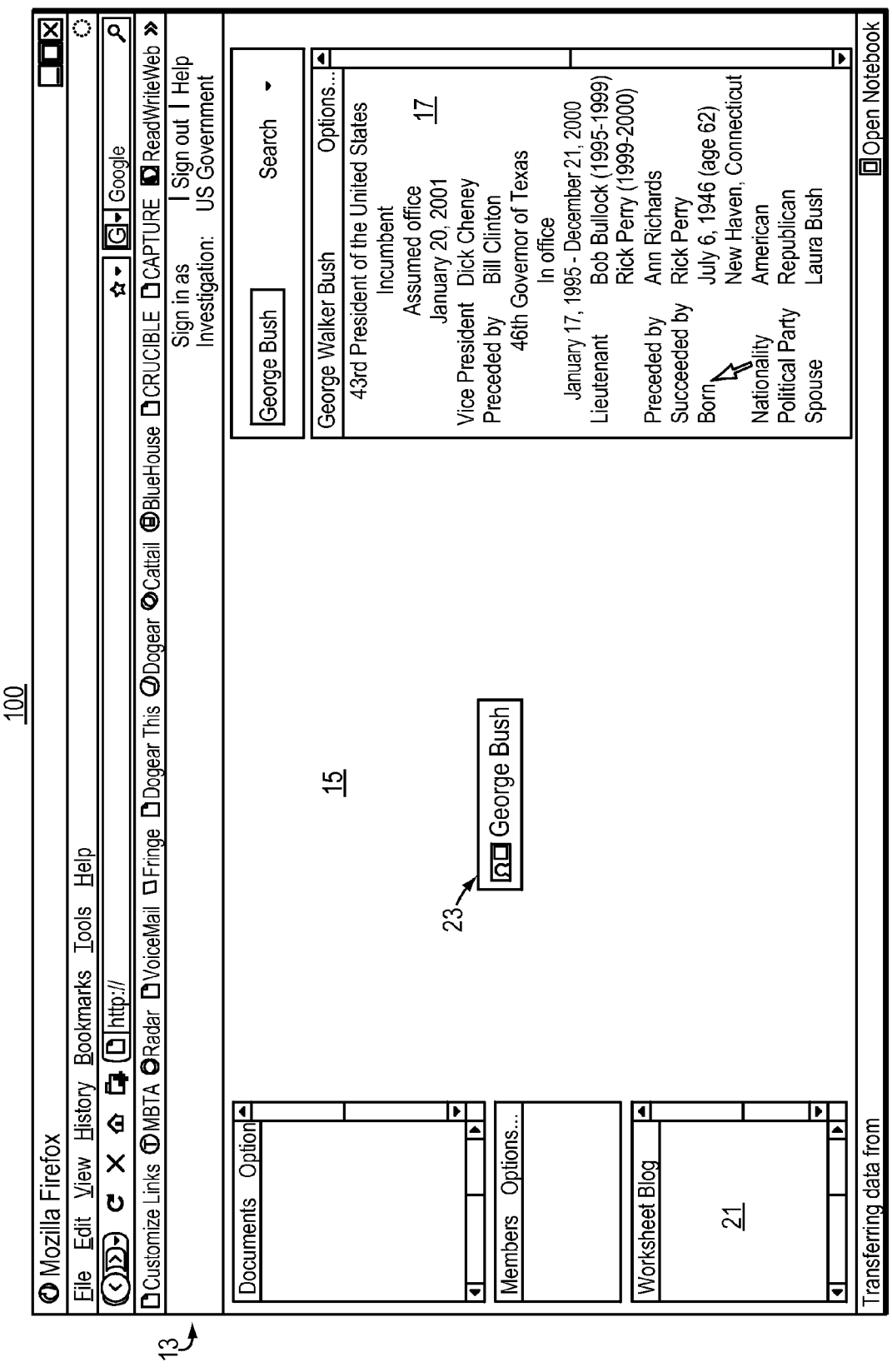
FIG. 3 is a schematic view of search results displayed in the user interfaced of the FIG. 1 embodiment and illustrates the invention's automatic information retrieval on a user's behalf.

FIGS. 1-3 are illustrative and show a collaborative reasoning and analysis system of sorts embodying the present invention JITIR system 100. Details of the collaborative reasoning and analysis system (basic structure and operation) and various aspects thereof not germane to the present invention are described in U.S. patent application Ser. No. 12/017,026 entitled "A System and Method for Supporting Collaborative Reasoning" filed Jan. 19, 2008 (by Assignee) and in U.S. patent application Ser. No. 11/867,890 entitled "A Method and Apparatus for Providing On-Demand Ontology Creation and Extension" filed Oct. 5, 2007 (by Assignee), both of which are herein incorporated in their entirety.

In the illustrated embodiment, the invention system 100 has a user interface 13 and a responsive search member 19 (e.g., search engine or process, see FIG. 4 detailed later). The user interface 13 includes: (a) an operative work area referred to herein as an investigative tableau 15, and (b) a sidebar 17. The investigation tableau 15 enables end-users to represent real world items, such as people, groups/organizations, places, events and so on, using semantic entities 23. The user interface 13 displays the semantic entities in the tableau 15 in response to user interaction with tableau 15, for example toward a user task.

Towards that end, the investigation tableau 15/user interface 13 also enables an end user to arrange the displayed entities 23 in the tableau 15 along with user created (defined) claims about the entities 23, hypotheses and evidence. These operations (user creation of a semantic entity, user selection of an entity, user creation of a claim and user arrangement of a claim and/or entity) are implemented with technologies disclosed in U.S. patent Ser. Nos. 11/867,890 and 12/017,026 (both by assignee and cited above) herein incorporated by reference.

User interface 13 and tableau 15 also enable a user to enter (create and place) free form text notes 21 on the tableau 15. Contents of the text notes 21 may include names of or references to one or more of the semantic entities 23. In particular, contents of text notes 21 may refer to or include names of semantic entities 23 that have not been identified before within tableau 15. Invention system 100 identifies such semantic entities 23 mentioned in the text notes 21 and stores corresponding semantic entity data in a system knowledge store 52 (FIG. 4).

Throughout a user's task and the foregoing user interaction/activities with semantic entities 23 and claims of tableau 15, system 100 draws, extracts or otherwise obtains semantic information. System 100 stores this semantic information along with the displayed entities 23 and claims of tableau 15 in the system semantic knowledge store 52 (FIG. 4.)

User interface 13 detects user interaction with a displayed entity 23 in tableau 15 and automatically (without user request or command) initiates a search by search member 19 in a background process. The search/background process does not interrupt or interfere with user activity and interaction. Detected user interaction with a displayed entity 23 may be:

user selection of a displayed entity 23 in tableau 15,
user creation of a semantic entity in tableau 15, and
user selection of an identified semantic entity in a textual note 21 in tableau 15, and the like.

Such a user selection of a displayed entity 23 in tableau 15 may be by a user indicating a portion of tableau 15, for instance by forming (drawing, dragging, etc.) an outline border about a desired portion. Other visual selection or graphical indication of a subject portion chosen/defined by the user is suitable. The entities within the user selected/defined portion are considered to be user selected with respect to triggering a search by search member 19 of the present invention.

Likewise user selection of a text note 21 containing multiple identified semantic entities 23 triggers search member 19 to search for information for each of the multiple identified entities.

Thus on input in a background process, search member 19 receives from user interface 13 an indication of one or more displayed entities 23 that the user is detected as interacting with (i.e., that are detected as currently being under user interactions). The system 100 supports continued user activity and interaction. Search member 19 searches internal knowledge base 52 and/or external knowledge bases 54 (FIG. 4) guided by the semantic information drawn from tableau 15 representing the user's task. The external knowledge bases 54 may include DBPedia, internet-mediated data stores, and other knowledge/data stores. Search member 19 accesses and searches external knowledge bases 54 with known techniques (e.g., link technology, application program interfaces, etc.).

In turn, search member 19 produces respective search results. The search results include information about the input entity(ies) 23 based on respective semantic data. This information is more directly relevant and specific to the subject entity(ies) 23 as compared to text-based searches due to the semantic data. Search member 19 automatically (without user request or command) displays the search results in sidebar 17. In this way, invention system 100 provides automatic information retrieval on a user's behalf and improved (i.e., semantic-based) just-in-time information retrieval.

In the example shown in FIGS. 1-3, a user creates an entity 23 named "George Bush". The invention system 100 determines that there are multiple instances of entities named George Bush in its knowledge base 52, and thus considers the entity 23 reference ambiguous initially. In FIG. 2, the sidebar 17 displays the known referents, and the user is given the opportunity to disambiguate—to be more precise about which George Bush is being referred to. User interface 13 enables the user to effectively select the current subject from the listed options in sidebar 17. Once disambiguation is complete, the system 100/search member 19 performs the semantic-based search for information about the subject entity 23 and displays (at sidebar 17) the information associated with the particular George Bush in question. FIG. 3 is illustrative; the system 100 allows the user to drag (or otherwise move) information of interest out of the sidebar 17 and into the investigation if desired. Subsequent user interaction with/selection of this entity 23 causes search member 19 to immediately display the associated information in the sidebar 17 without requiring disambiguation to be repeated, as the identity of the entity 23 has at the time already been established.

The information (search results) that populates the sidebar 17 for a disambiguated entity 23 may be drawn from a single monolithic knowledge base 52 or 54 as in the example above, or it can be extracted from multiple knowledge bases 52, 54, or from multiple investigations (users' tasks) within a single non-monolithic knowledge base 52 or 54. In the latter cases, there may be repetitive information about an entity stored in different knowledge bases or different investigations. There may also be conflicting information, such as disagreement in the data on a particular birth date, for example. In such cases, the sidebar 17 can provide summarization on the number of different sources for each piece of information, and enumeration of the sources if the user wishes to delve deeper.

Just-in-time Semantic Information Retrieval provides the user with ready access to information about the entities 23 that the user has identified. The user is then able to bring pertinent information into the investigation/user task. When information is imported from the sidebar 17, full provenance information is maintained, so it will be possible to ascertain who brought the information in, when it was brought in, and the source or sources from which it was obtained. Sidebar 17 also allows user dismissal of the search results as desired.

Unlike conventional Just-in-time information retrieval solutions, the present invention's semantic nature of the stored information allows for finer granularity, higher specificity, and greater relevance of information retrieval. Rather than presenting the user with a list of documents that merely mention the selected entity 23, Applicant's approach allows embodiments of the invention to provide a list of claims directly concerning the selected entity. In the example above, embodiments provide facts about (or at least assertions about) George Bush, not documents or articles in which his name merely happens to be mentioned, although the system 100 could also be used to present documents/articles in the sidebar 17 as well, as supplementary materials. The finer grain and additional structure of the semantic information allow one to combine information from different sources, and recognize when these sources agree or disagree about a particular claim.

While the above embodiment tableau 15 has been used in the illustration of the notion of just-in-time semantic retrieval, it should be noted that it is just one possible embodiment. Any method of organizing information that allows the establishment of semantic context could be substituted for the tableau 15, including systems that display documents or web pages and perform semantic entity extraction upon them.

Figure 4:
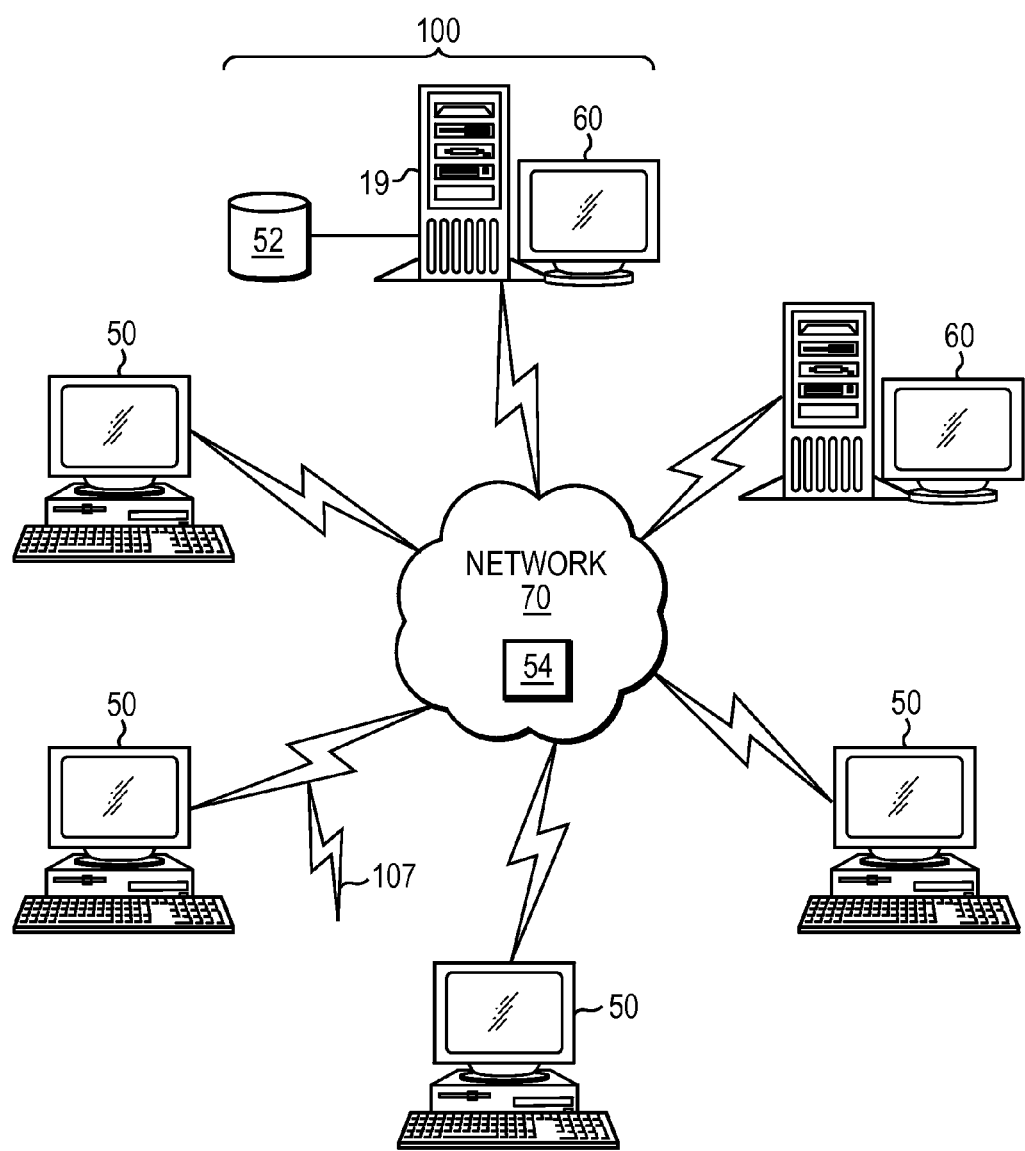
FIG. 4 is a schematic view of a computer network in which embodiments of the present invention may be implemented.

With reference now to FIG. 4, illustrated is a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. External knowledge stores 54 (e.g., DBPedia, internet-mediated data stores and others) are accessed through network 70 using respective protocols. Other electronic device/computer network architectures are suitable.

Figure 5:
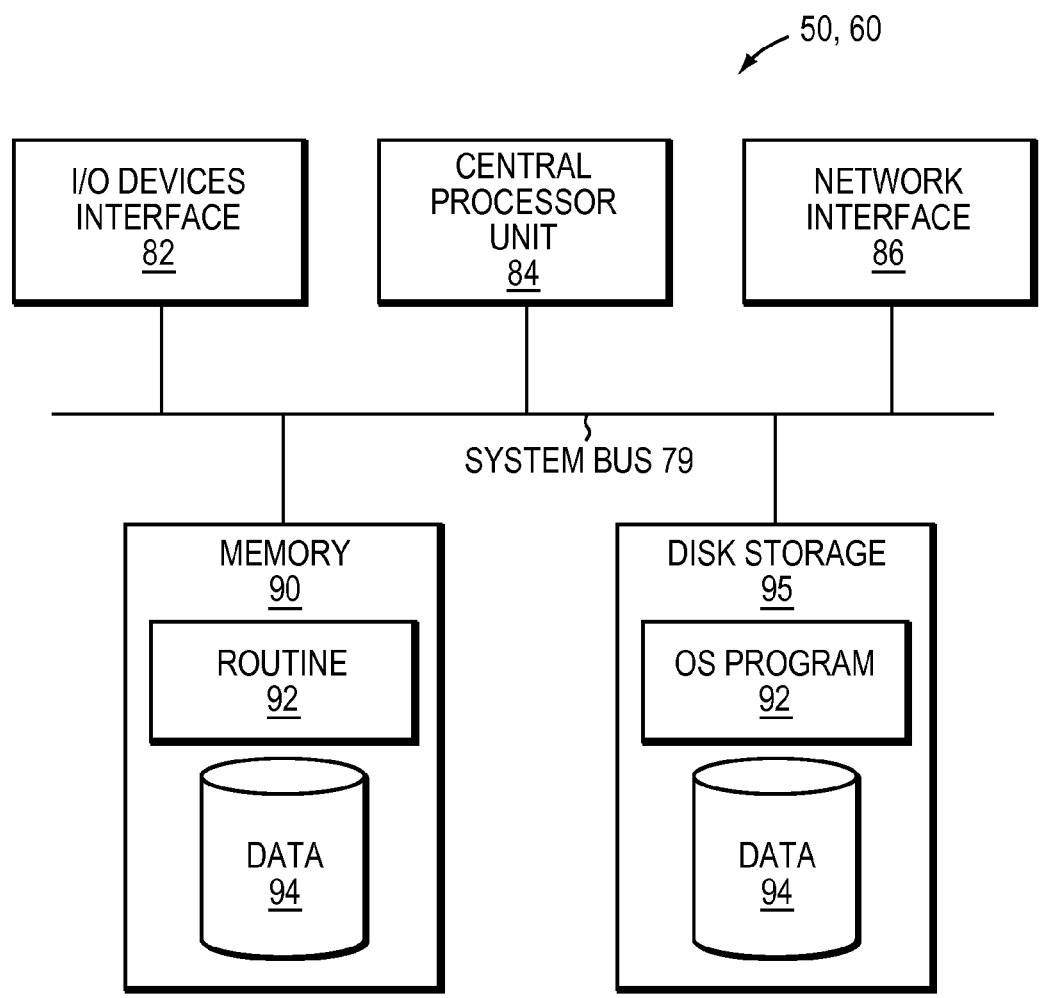
FIG. 5 is a block diagram of a computer node in the network of FIG. 4.

FIG. 5 is a diagram of the internal structure of a computer (e.g., client processor/device 50 or server computers 60) in the computer system 100 of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., user interface 13, search member 19 and supporting code and knowledge bases/data stores 52 detailed above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
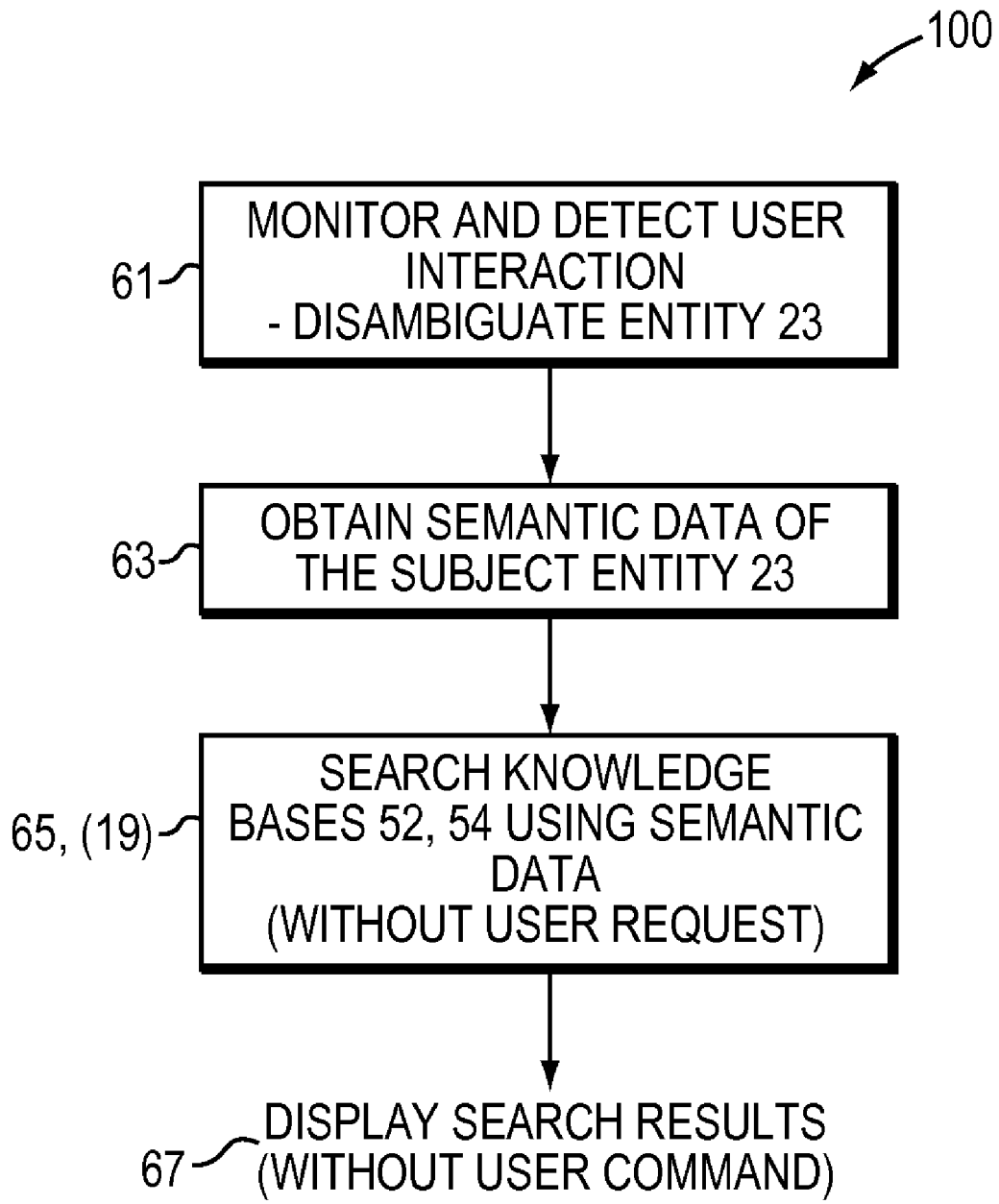
FIG. 6 is a flow diagram of an embodiment of the present invention.

Referring now to FIG. 6, a flow diagram of one embodiment 100 is presented. Invention system 100 at step 61, monitors and detects user interaction with displayed semantic entities 23 in user interface 13. One embodiment detects 61 user interaction as including entity creation, entity selection, user selection or visual indication of a portion of a work area (e.g., tableau 15) containing one or more semantic entities, and user selection of a textual note 21 identifying one or more semantic entities 23. Step 61 determines if the detected entity 23 is ambiguous given system knowledge base 52. If so, step 61 through user interface 13 prompts the user to disambiguate, for example by listing a pick list for the user to make a selection from.

In turn, step 63 accesses or otherwise obtains semantic data of the disambiguated subject entity 23 (which may include one or more entities). Step 63 may draw semantic data from the current user task, the work area 15 and the like. Using this semantic data, search member 19 (step 65) initiates a background process and searches any combination of internal and/or external knowledge bases 52, 54. The external knowledge bases may be internet-mediated for example and communicated with using hypertext (e.g., HTML) techniques, mark-up language (e.g., XML) techniques and the like. Search member 19 initiates the search without user request or command, and thus system 100 searches for information about subject entity(ies) 23 automatically and on the user's behalf. Because the search is based on semantic data, the search results have increased relevance and specificity.

Next, step 67 through user interface 13 displays the search results of step 65. In particular, step 67 displays in sidebar 17 entity information from the search results. This is accomplished without user request or command and provides just in time semantic information to the user as heretofore unachieved in the prior art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method of retrieving information comprising:
   in a user interface, representing a real world item by a semantic entity;
   detecting user interaction with the user interface, including detecting the user graphically interacting with the semantic entity as displayed in the user interface;
   throughout the detected user graphical interaction with the semantic entity as displayed in the user interface, obtaining semantic data of the displayed semantic entity, said obtaining semantic data including disambiguating references to the displayed semantic entity;
   using the obtained and disambiguated semantic data and searching one or more knowledge bases for information about the displayed semantic entity, resulting in search results having information directly concerning the displayed semantic entity instead of the search results having material that merely mentions a name of the real world item being represented by the display semantic entity, said search results being more relevant than that of text-based, non-semantic searches; and
   automatically displaying to a user the information about the displayed semantic entity from the search results, wherein the searching and displaying are free of user request and support collaborative reasoning about the real world item by supporting collection and organization of information directly concerning the displayed semantic entity.

2. A computer method as claimed in claim 1 wherein the displayed semantic entity represents any one of a person, an organization, a place and event.

3. A method as claimed in claim 1 wherein the step of detecting includes providing an operative work area in which relevant semantic entities are displayed, the work area enabling relevant semantic entities and claims about the semantic entities to be represented and arranged by a user.

4. A method as claimed in claim 3 wherein user graphical interaction with a displayed semantic entity includes graphical user indication of selection of a portion of the operative work area, where the portion contains one or more semantic entities then the user interaction is considered to be with respect to each of the contained semantic entities.

5. A method as claimed in claim 1 wherein detecting user interaction includes detecting any of:
   user selection of a semantic entity,
   user creation of a semantic entity, and
   user selection of a textual note identifying a semantic entity.

6. A method as claimed in claim 1 wherein user interaction includes user selection of a textual note identifying multiple entities; and
   the step of searching includes searching for information about the multiple entities.

7. A method as claimed in claim 1 wherein the user interaction is part of a user task, and the step of obtaining semantic data includes drawing semantic data from the user task.

8. A method as claimed in claim 1 wherein the searching is of any combination of an internal datastore and external datastore.

9. A method as claimed in claim 8 wherein at least one of the external data stores is internet-mediated.

10. A method as claimed in claim 1 wherein the displaying includes:
    providing a sidebar displaying the information about the displayed entity from the search results, the sidebar being configured to enable any one or combination of: user dismissal of the search results, user copying of the search results, and user disambiguation of the displayed semantic entity to obtain semantic data.

11. A computer apparatus for retrieving information comprising:
    a processor;
    a user interface executed by the processor, the user interface displaying a semantic entity representing a real world item and the user interface enabling user graphical interaction with the displayed semantic entity, and the displayed semantic entity having semantic data; and
    a search member executable by the processor and responsive to user interaction with the displayed semantic entity and, using the semantic data, searching a knowledge base for information about the displayed semantic entity, resulting in search results having information directly concerning the displayed semantic entity instead of being search results having material that merely mentions a name of the real world item being requested by the displayed semantic entity, said search results being more relevant than that of text-based, non-semantic searches;
    the user interface through a display monitor, automatically displaying to a user the information about the displayed semantic entity from the search results wherein the searching and displaying are free of user request and support collaborative reasoning about the real world item by supporting collection and organization of information directly concerning the displayed semantic entity.

12. A computer apparatus as claimed in claim 11 wherein the displayed semantic entity represents any one of a person, an organization, a place and event.

13. A computer apparatus as claimed in claim 11 wherein the user interface provides an operative work area in which relevant semantic entities are displayed, the work area enabling relevant semantic entities and claims about the semantic entities to be represented and arranged by a user.

14. A computer apparatus as claimed in 13 wherein user graphical interaction with the displayed semantic entity includes graphical user indication of selection of a portion of the operative work area, where the portion contains one or more semantic entities then the user interaction is considered to be with respect to each of the contained semantic entities.

15. A computer apparatus as claimed in 11 wherein user graphical interaction includes any one of:
  selection of a semantic entity,
  user creation of a semantic entity, and
  user selection of a textual note identifying a semantic entity.

16. A computer apparatus as claimed in 11 wherein user graphical interaction includes user selection of a textual note identifying multiple entities; and
  the search member searches for information about the multiple entities.

17. A computer apparatus as claimed in 11 wherein the user graphical interaction is part of a user task, and the displayed semantic entity has semantic data from the user task.

18. A computer apparatus as claimed in 17 wherein the user interface prompts user disambiguation of the displayed semantic entity from other entities.

19. A computer apparatus as claimed in 11 wherein the search member searches any combination of an internal data store and an external data store.

20. A computer apparatus as claimed in 19 wherein the search member searches at least one internet-mediated data store.

21. A computer apparatus as claimed in 11 wherein the user interface automatically displaying the information includes providing a sidebar displaying the information from the search results.

22. A computer apparatus as claimed in 21 wherein the sidebar enables user dismissal of the search results.

23. A computer program product for retrieving information comprising:
  a computer readable storage medium having computer readable program code embodied therewith;
  the computer readable program code including program code configured to cause a computer to:
    in a user interface, represent a real world item by a semantic entity;
    detect user graphical interaction, through the user interface, with the semantic entity as displayed in the user interface,
    using semantic data of the displayed semantic entity, search one or more knowledge bases for information about the displayed semantic entity, resulting in search results having information directly concerning the displayed semantic entity instead of being search results having material that merely mentions a name of the represented real world item, said search results being more relevant than that of text-based, non-semantic searches, and
    display information about the displayed semantic entity from the search results, wherein the searching and displaying are automatic and free of user request and support collaborative reasoning about the real world item by supporting collection and organization of information directly concerning the displayed semantic entity.

* * * * *